US008810398B2

(12) United States Patent
Bennett et al.

(10) Patent No.: US 8,810,398 B2
(45) Date of Patent: Aug. 19, 2014

(54) CONTAINER STATUS MONITORING SYSTEMS AND METHODS

(75) Inventors: Gisele Bennett, Atlanta, GA (US);
Jonathan C. James, Smyma, GA (US);
Timothy M. Strike, Marietta, GA (US);
Terence Haran, Smyma, GA (US);
David Fentem, Lawrenceville, GA (US);
Tedd Toler, Atlanta, GA (US);
Benjamin Brackett, Atlanta, GA (US);
Jeffrey Jo, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 13/514,123

(22) PCT Filed: Aug. 13, 2010

(86) PCT No.: PCT/US2010/045496
§ 371 (c)(1),
(2), (4) Date: Jun. 28, 2012

(87) PCT Pub. No.: WO2012/021136
PCT Pub. Date: Feb. 16, 2012

(65) Prior Publication Data
US 2013/0187777 A1    Jul. 25, 2013

(51) Int. Cl.
G08B 13/08    (2006.01)
G08B 29/04    (2006.01)
G06Q 10/08    (2012.01)
G08B 13/22    (2006.01)

(52) U.S. Cl.
CPC .............. *G08B 13/22* (2013.01); *G08B 29/046* (2013.01); *G06Q 10/0833* (2013.01); *G08B 13/08* (2013.01)
USPC ........ 340/545.5; 340/10.1; 340/500; 235/382

(58) Field of Classification Search
USPC ........ 340/500, 531, 539.1, 545.5–545.9, 1.1, 340/5.1, 5.2, 5.6, 10.1; 235/375, 382
See application file for complete search history.

(56) References Cited

U.S. PATENT DOCUMENTS 5,111,184 A    5/1992 Heaton et al.
5,936,522 A    8/1999 Vogt
(Continued)

OTHER PUBLICATIONS

Supplementary European Search Report dated Mar. 25, 2013 for related European Application No. EP10855985.

(Continued)

*Primary Examiner* — George Bugg
*Assistant Examiner* — Edny Labbees
(74) *Attorney, Agent, or Firm* — Troutman Sanders LLP; Ryan A. Schneider; Christopher W. Glass

(57) ABSTRACT

A container monitoring system can generally comprise a first door controller, a second door controller, and a controller module. The first door controller module can be disposed in communication with a controller module. The first door controller module can be configured to receive a first random generated code from the controller module and further configured to store the first random generated code. The second door controller module can be disposed in communication with the controller module. The second door controller module can be configured to receive a second random generated code from the controller module and further configured to store the second random generated code. The controller module can be configured to separately interrogate the first door controller and the second door controller and configured to establish an alarm condition based on one or more signals received from the first door controller and the second door controller.

20 Claims, 11 Drawing Sheets

(56) References Cited

U.S. PATENT DOCUMENTS

| | | | |
|---|---|---|---|
| 8,006,914 B2* | 8/2011 | Lapstun et al. | 235/494 |
| 8,456,278 B1* | 6/2013 | Bergman et al. | 340/5.8 |
| 2004/0263332 A1 | 12/2004 | Maple et al. | |
| 2005/0248456 A1* | 11/2005 | Britton et al. | 340/539.29 |
| 2007/0188322 A1 | 8/2007 | English et al. | |
| 2008/0074652 A1* | 3/2008 | Fouquet et al. | 356/218 |
| 2010/0163731 A1* | 7/2010 | Haran et al. | 250/340 |

OTHER PUBLICATIONS

Search Opinion dated Mar. 25, 2013 for related European Application No. EP10855985.

International Search Report and Written Opinion dated Oct. 14, 2010 for related PCT Patent Application No. PCT/US2010/045496.

\* cited by examiner

FIG. 7

| Source Module | Receiving Module | Measured Quantities | Purpose |
|---|---|---|---|
| Controller | Door | Pulse timing | Command communications |
| Door | Controller | Optical power | Detect optical path change – dust, tampering |
| | | Pulse timing | Response communications |
| | | Irradiance centroid position | Detection of lateral movement of door |
| Controller | Controller | Optical power | Detection of door module presence |
| | | Irradiance centroid position | Detection of angular movement of door |

FIG. 8

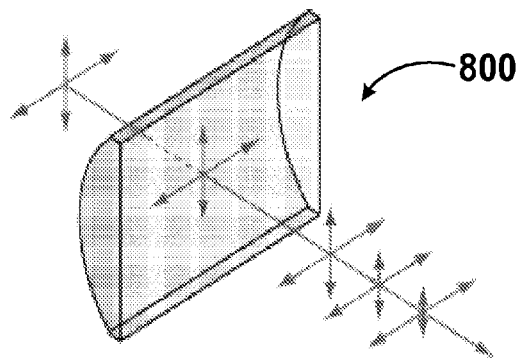

FIG. 9

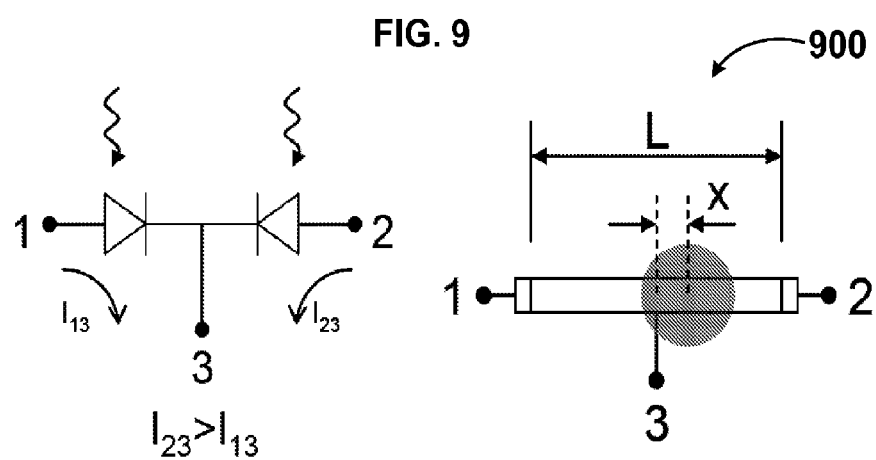

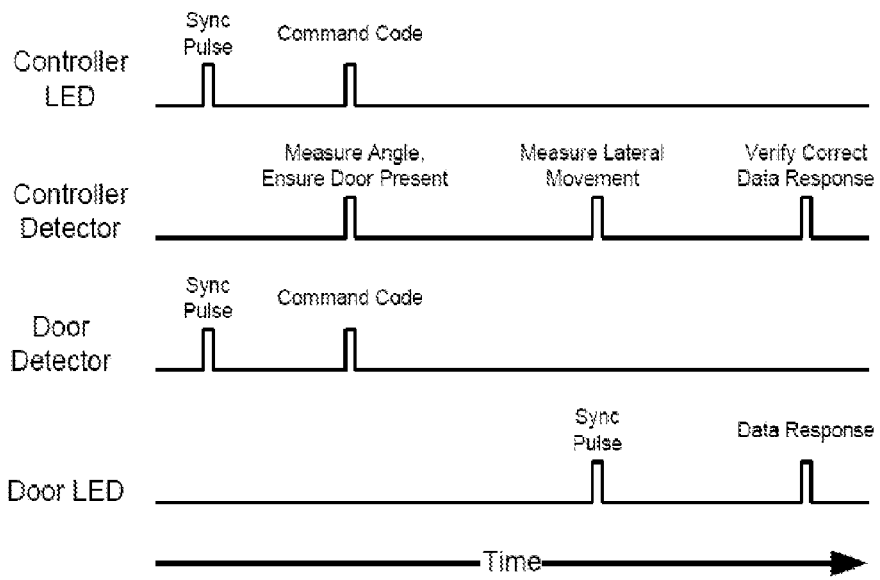

FIG. 16

| Time Slot | Definition | Comments |
|---|---|---|
| 0 | Sync Pulse | Instruct door module to prepare for next command |
| 1 – 225 | Delay | Allows controller time to enable LED reflection measurement and door module time to prepare for command/data pulse |
| 226 – 255 | Commands | Interrogate, Accept Seed, Report CRNG byte, Report Status, Test LEDs/Timing, Use LED, Report Firmware Version, Future Expansion |
| 256 – 511 | Data Value | Eight bit portion of 32-bit Seed Value |

FIG. 17

| Time Slot | Definition | Comments |
|---|---|---|
| 0 | Sync Pulse | Provide baseline for time slot definitions |
| 1 – 225 | Delay | Processing time |
| 226 – 255 | Status | ACK with battery status, ACK with BIT status, Future Expansion |
| 256 – 511 | Data Value | Eight bit portion of 32-bit CRNG code, Door module firmware version |

CONTAINER STATUS MONITORING SYSTEMS AND METHODS

CROSS REFERENCE TO RELATED APPLICATIONS

Embodiments of the present invention may be related to previously filed PCT Patent Application Number PCT/US2007/001368 which was filed 19 Jan. 2007 and is entitled Determining Enclosure Intrusions; said PCT Patent application is incorporated herein by reference in its entirety as if fully set forth below.

TECHNICAL FIELD

Embodiments of the present invention relate generally to monitoring systems, and more particularly, to door status monitoring systems and methods such as, for example, systems and methods for monitoring status of access doors for cargo containers.

BACKGROUND

Security threats stemming from containers is an area where technology can aid in preventing or thwarting security breaches. As one example, international shipping containers carrying goods into a country may be tampered with or contain unauthorized or harmful material. Vulnerability to tampering is a shortcoming in conventional container security devices.

Current container security technologies do not fully address the full array of shipping container security concerns. These concerns include harsh environmental conditions, extreme operating conditions, and high false-alarm rates.

As a result there is a need for improved container status monitoring systems and methods. Improved systems and methods that can provide reliable container monitoring without reduction of or intrusion into cargo space are also needed. It is to the provision of such systems and methods that embodiments of the present invention are directed.

BRIEF SUMMARY OF EXEMPLARY EMBODIMENTS

Embodiments of the present invention provide improved shipping container status monitoring systems and methods. In general terms, embodiments of the present invention include door status monitor systems arranged to detect tampering events for a shipping container. A door status monitor system can generally include an array of sensors operatively disposed to communicate with a controller. The controller can continually monitor sensors to determine possible tampering events. If tampering events occur, the controller can log the event or transmit tamper signals. Embodiments of the present invention can be used on various types of containers, so it is to be understood that while exemplary embodiments may be discussed with respect to cargo containers, the full scope of the invention is not so limited.

According to some embodiments, the present invention can be a container monitoring system configured to monitor access to and conditional status of a container. Such systems can generally comprise a plurality of door controllers and a controller module. A first door controller module can be disposed in communication with the controller module. The first door controller module can receive a first random generated code from the controller module and store the first random generated code. A second door controller module can be disposed in communication with the controller module. The second door controller module can receive a second random generated code from the controller module and store the second random generated code. The controller module can separately interrogate the first door controller and the second door controller and establish an alarm condition based on one or more signals received from the first door controller and the second door controller. Alarm conditions can be based on errors in receiving at least one of the first random generated code from the first door controller or the second random generated code from the second door controller. Alarm conditions can also be based on a power level of an optical signal received at the controller module from at least one of the first door controller or the second door controller.

System embodiments of the present invention can also include additional features. For example, the controller module can contain a first optical transceiver to communicate with the first door controller and a second optical transceiver to communicate with the second door controller. As another example, the controller module, the first door module, and the second door module can be configured for installation within a container and in arrangement wherein the controller module is configured to be positioned proximate a middle header region, the first door module is configured to be positioned on a first door of the container proximate the middle header region, and the second door module is configured to be positioned on a second door of the container proximate the middle header region. System embodiments can include a wireless transceiver configured to transmit data from the controller module to a wireless device remote from the controller module.

System embodiments can include yet additional features. For example, controller modules can be configured to distinctly optically communicate with the first and second door controller modules, and the first and second door controller modules are configured to transmit optical signals toward the controller module. Controller modules can contain a plurality of memory storage areas to separately store firmware data, security data, and commercial data. Controller modules can comprise a plano-convex lens to focus optical signals received from the first and second door controller module onto a photodetector. Door controller modules can be arranged so that optical transmitters disposed within the first and second door controller modules are configured to transmit light in a normal direct toward the plane of a detector housed within the controller module.

Embodiments of the present invention also include methods. Indeed some embodiments can include a method to monitor access to and conditional status of a container. Such a method can generally include providing a main controller module and a pair of door modules, configuring the main controller to conduct two-way communications with the pair of door modules, configuring the main controller to randomly generate a first codeword and a second codeword and to provide the first codeword to one of the door modules and the second codeword to the other door module; and configuring the main controller to interrogate the pair of door modules and to establish an alarm condition based at least partially on at least one of whether the door modules return a provided codeword that matches the first or second codeword and predefined alarm parameters. Methods can also include configuring the main controller to wirelessly communicate with a remote wireless device and to receive data from the wireless device that includes the predefined alarm parameters. Some methods can also include providing the main controller with a memory for storing alarm event data.

Other method features are also possible according to some method embodiments. These features can include, for example, providing the main controller and the pair of door modules with LEDs and photodetectors enabling the main controller to bi-directionally optically communicate with each of the pair of door modules. As another example, methods can include configuring the main controller to be installed at an internal location of a shipping container and the pair of door modules to be installed on inside positions of the doors of the shipping container at locations proximate the main controller. In some methods, a main controller can determines position data about the pair of door modules based on comparing a baseline signal strength value to a signal strength value received from the pair of door modules.

Method embodiments can include yet additional features. Some methods can include configuring the controller module to comprise a plano-convex cylindrical lens and a one-dimensional position sensing detector for communication with each of the pair of door modules. Other methods can include configuring the controller module to include a temperature sensor that senses temperature data and provides the temperature data to a memory for storage. In other embodiments, controller modules can request a codeword from the pair of door modules to determine if the codeword matches the previously provided codeword prior to continuing communication with the pair of door modules. Still yet some methods can include configuring the controller module to bi-directionally communicate with the pair of door modules using an optical pulsed communication protocol, wherein the optical pulsed communication protocol includes a sync pulse portion, a delay portion, a commands portion, and a data value portion.

Embodiments of the present invention can also include container monitoring systems configured to monitor access to and conditional status of a container. Components of the container monitoring system can be configured to be affixed to internal locations within the container. Systems can generally comprise door and controller modules. Exemplary systems can include a first door module comprising a power supply, an LED array, a photodetector, and a first-door-module processor; a second door module comprising a power supply, an LED array, a photodetector, and a second-door-module processor; and a controller module assembly comprising a power supply, an LED array, a photodetector array, and a controller-module processor. The controller-module processor can be configured to generate psuedo-random code words for provision to the first-door-module processor and the second-door-module processor. The controller-module processor can be further configured to determine an alarm event based on positions of the first and second door modules relative to the controller module. In some implementations, the controller module can be attached to a header portion of a container, the first door module can be attached to a first door of the container, and the second door module can be attached to a second door of the container. The controller module can determine positioning status information of the first and second doors by communications with the first door module and the second door module.

Container monitoring system embodiments of the present invention can include additional features. For example, the LED array of the controller module assembly can comprise a first LED positioned to communicate with the first door module and a second LED positioned to communicate with the second door module. In another example, the photodetector array of the controller module can comprise a first lens positioned to receive an optical signal from the first door module and a second lens positioned to receive an optical signal from the second door module. In some embodiments, the controller module can also comprise an RF transceiver enabling the controller module to wirelessly communicate with a remote wireless device. In other embodiments, the controller module configured to receive wireless arm and disarm commands from a wireless device, and in response to the commands, arm or disarm the system to monitor a container. The first door module and the second door module can also each comprise a reflective surface positioned to reflect a light signal received from the controller module back to the controller module. In some embodiments, the controller module can be configured to generate pseudo-random code words (e.g., by using a Park-Miller-Carta pseudo random number generator). The controller-module processor, the first-door-module processor, and the second-door-module processor can also be configured to communicate with each other using a segmented, pulsed optical communication protocol. Also, in accordance with some embodiments, the controller module processor can be configured to determine an alarm event based on data received from at least one of the first door module and the second door module.

Other aspects and features of embodiments of the present invention will become apparent to those of ordinary skill in the art, upon reviewing the following description of specific, exemplary embodiments of the present invention in concert with the figures. While features of the present invention may be discussed in this Application relative to certain embodiments and figures, all embodiments of the present invention can include one or more of the features discussed herein. While one or more embodiments may be discussed as having certain advantageous features, one or more of such features may also be used with the various embodiments of the invention discussed herein. In similar fashion, while exemplary embodiments may be discussed below as system or method embodiments it is to be understood that such exemplary embodiments can be implemented in various devices, systems, and methods. Embodiments of the present invention can be implemented with hardware components, software logic, or a combination of both.

BRIEF DESCRIPTION OF FIGURES

FIG. 7 illustrates a table providing communication characteristics between a source module and a receiving module in accordance with some embodiments of the present invention.

FIG. 8 illustrates a graphical depiction of a lens used in controller module devices according to some embodiments of the present invention.

FIG. 9 illustrates schematic and optical diagrams of a photodetector used in controller module devices according to some embodiments of the present invention.

FIG. 15 illustrates a timing diagram showing interrogation of a door module by a controller module in accordance with some embodiments of the present invention.

FIG. 16 illustrates a table providing an exemplary controller module time slot definition protocol in accordance with some embodiments of the present invention.

FIG. 17 illustrates a table providing an exemplary door module time slot definition protocol in accordance with some embodiments of the present invention.

DETAILED DESCRIPTION OF PREFERRED & ALTERNATIVE EMBODIMENTS

To facilitate an understanding of the principles and features of the various embodiments of the invention, various illustrative embodiments are explained below. As will be explained, embodiments of the present invention provide improved and advantageous cargo container monitoring systems and methods. Advantageously, embodiments of the present invention enable efficient and reliable monitoring of numerous containers that may move through a controlled logistics area (e.g., a national/international sea port, air port, customs checkpoint, border control station, shipping yard, or the like). Some embodiments can also utilize wireless network systems and component devices within wireless networks for monitoring of containers.

General Design & Operation Theory

Figure 1:
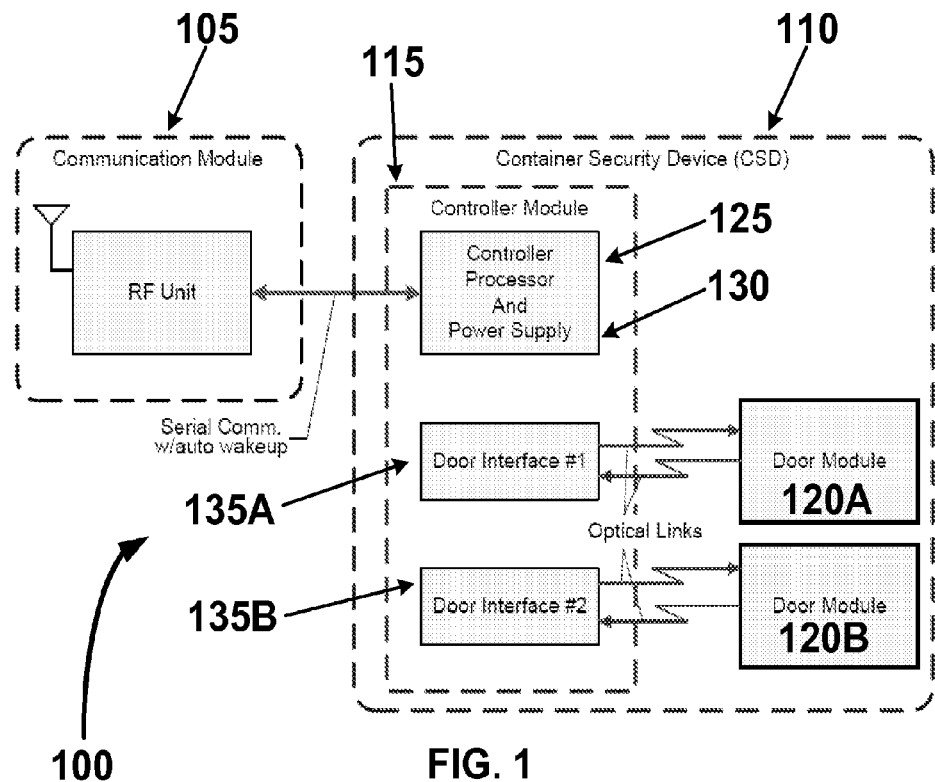
FIG. 1 illustrates a functional block diagram of a container security device monitoring system in accordance with some embodiments of the present invention.

Turning now to the figures wherein, FIG. 1 illustrates a functional block diagram of a container security device monitoring system 100 in accordance with some embodiments of the present invention. As shown, the system 100 generally includes a communication module 105 and a container security device 110 (sometimes referred to as CSD 110).

The communication module 105 can be a wireless device configured to wirelessly communicate with the CSD 110. The communication module 105 also preferably has a user interface that enables a user to operate or manage functions of the communication module 105. Communication modules 105 can include a variety of wireless user interfaces configured to interface with the CSD 110. By using a communication module 105, a user can login to a CSD 110 to access status data and other data stored within the CSD 110. In addition, users can use a communication module 105 to arm/disarm a CSD 110. Arming can take place at a departure location/port and disarming can take place at an arrival location/port.

It is envisioned that users can use varying types/models of wireless devices (as a communication module 105) with similar operating software (described below) to access, arm, and disarm one or more CSDs 110. This enables different users to both arm and disarm CSDs 110 at, for example, a container's departure and arrival locations. And it may be the case that one or more communication modules 105 are able to interact with a number of CSDs 110 at one time to facilitate data exchange between communication modules and CSDs 110. This would enable, for example, a large number of CSDs 110 to be armed/disarmed while on a shipping vessel and passing through an area where CSDs 110 can communicate with one or more communication modules 105.

The CSD 110 can be installed within a container and include one or more sub-components that enable the CSD 110 to securely maintain a container and monitor container status. The CSD's 110 sub-components can include a controller module 115 and one or more door modules 120A, 120B. The controller module 115 can be configured to wirelessly interact with the communication module 105 and the door modules 120A, 120B. In some embodiments, the controller module can generally include a controller 125, a power supply 130, and door interfaces 135A, 135B. The controller 125 and the power supply 130 can be integrated in a single unit (as illustrated) or in separate units. The door modules 120A, 120B can be spaced apart from the door interfaces 135A, 135B such that the controller module 115 can be wirelessly linked to the door modules 120A, 120B. The wireless links can be implemented with optical links as illustrated (and discussed in more detail below). By using the wireless links, the CSD 110 can be used to monitor the status of a container to ensure security of the container.

In currently preferred embodiments, for example, the CSD 110 can be installed within a container. For example, the controller module 115 can be positioned proximate a top, upper location of the container (e.g., rear door header location) and the door modules 120A, 120B can be positioned on upper, inside surfaces of container doors. In these positions, the controller module 115 can wirelessly interact with the door modules 120A, 120B to monitor whether a container's doors have been disturbed, moved, or opened from an initial locked state. While some embodiments of the present invention are discussed relative to shipping containers and maintaining security of shipping containers, embodiments of the present invention can be used for many types of containers. Indeed, container type is not important as the monitoring systems according to the present invention can be used to secure containers of any size, shape, or style.

As mentioned above, the system 100 can employ a number of wireless links between components to enable secure monitoring of a container. For example, door modules 120A, 120B and door interfaces 135A, 135B can have multi-directional optical links (e.g., bi-directional links) as the wireless links. These components can also include circuitry and embedded software. Bi-directional optical links enable these devices to transfer data between the controller module 115 and door modules 120A, 120B and authenticate door modules 120A, 120B responses and measuring door position. One mode of optical communication is via two optical pulses with the time between the pulses used to encode or derive the data. The use of optical pulses enables a low power data communication link, provides data via varying time, and allows for the measurement of the pulse on a position sensitive detector for door position. In some embodiments, data communicated via the optical links can be encrypted as desired.

Another advantageous feature of embodiments of the present invention relates to a communication protocol between the controller module 115 and the door modules 120A, 120B. To accomplish a high level of security, a pseudorandom number generation approach can be used to insure secure data transfer between the controller module 115 and the door modules 120A, 120B. In currently preferred embodiments, each door module 120A, 120B is seeded with a code randomly determined and provided by the controller module 115. During subsequent communication between the controller module 115 and the door modules 120A, 120B, the controller module 115 can authenticate and verify identity of the door modules 120A, 120B by asking for, receiving, and analyzing provided codes.

In this fashion, the controller module 115 ensures that it is communicating with door modules 120A, 120B after the system 100 has been armed. By seeding the door modules 120A, 120B at arming, generic door modules 120A, 120B can be used. This is advantageous because the door modules 120A, 120B are not required to be part of a matched set, can be reprogrammed for each use, and are not pre-seeded at manufacture or at other pre-arming instances. This increases the security of the communication link between the controller module 115 and the door modules 120A, 120B while reducing life cycle cost of the CSD 110.

Exemplary System Implementations

Figure 2:
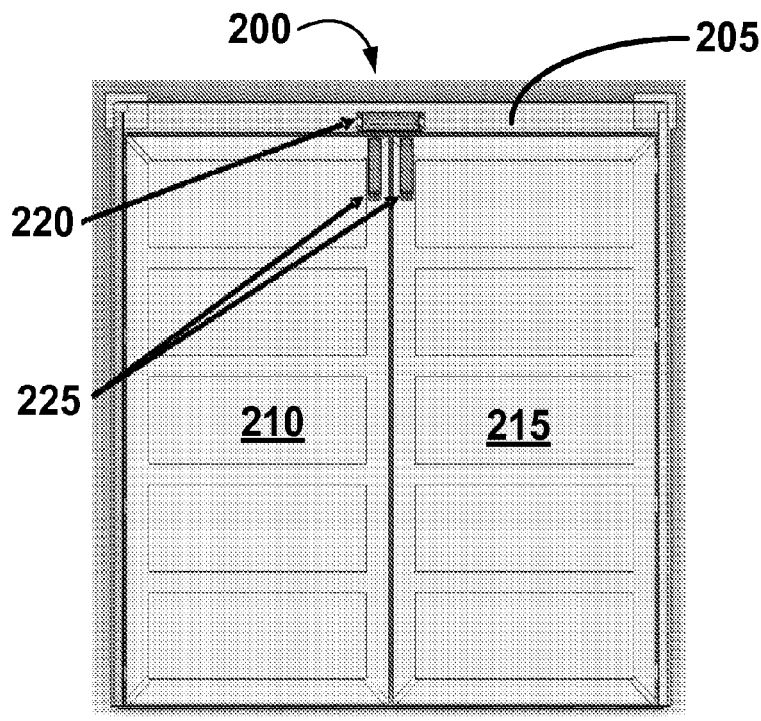
FIG. 2 illustrates an exemplary installation of a container door status monitoring system in accordance with some embodiments of the present invention.

FIG. 2 illustrates an exemplary installation of a shipping container door status monitoring system 200 in accordance with some embodiments of the present invention. In this embodiment, the system 200 is implemented to monitor a container 205 that has a first door 210 and a second door 215. As illustrated, the system 200 is generally disposed at an upper, middle location of the container 205. But the system 200 can be installed in other container locations as desired or required. The system 200 can include a controller module 220, a first door module 225A, and a second door module 225B. The controller module 220 can be mounted on a door header location and the door modules 225 can be mounted on opposing doors 210, 215. In this arrangement, the system 200 can monitor whether the doors 210, 215 have been moved from an initial state or a post-arming state. The controller module 220 and the door modules 225 form together a CSD component of the system 200.

Figure 3:
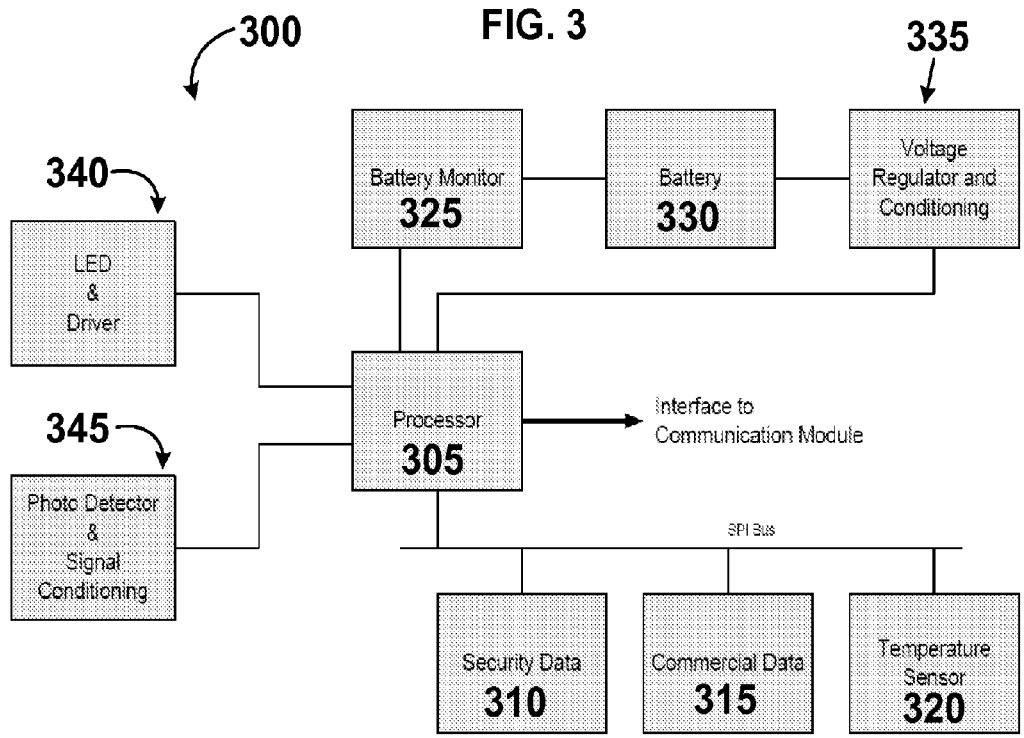
FIG. 3 illustrates a functional block diagram of a controller module for a container security device monitoring system in accordance with some embodiments of the present invention.
Figure 6:
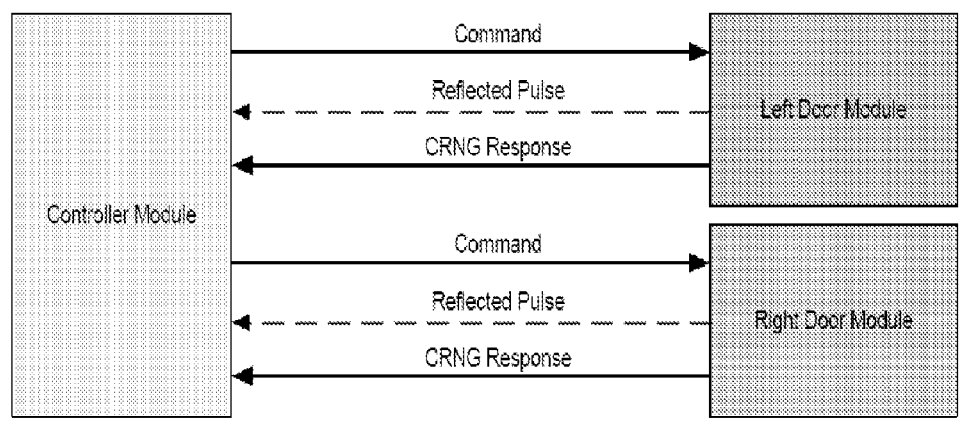
FIG. 6 illustrates communications occurring between a controller module and door modules of a container door status monitoring system in accordance with some embodiments of the present invention.
Figure 10:
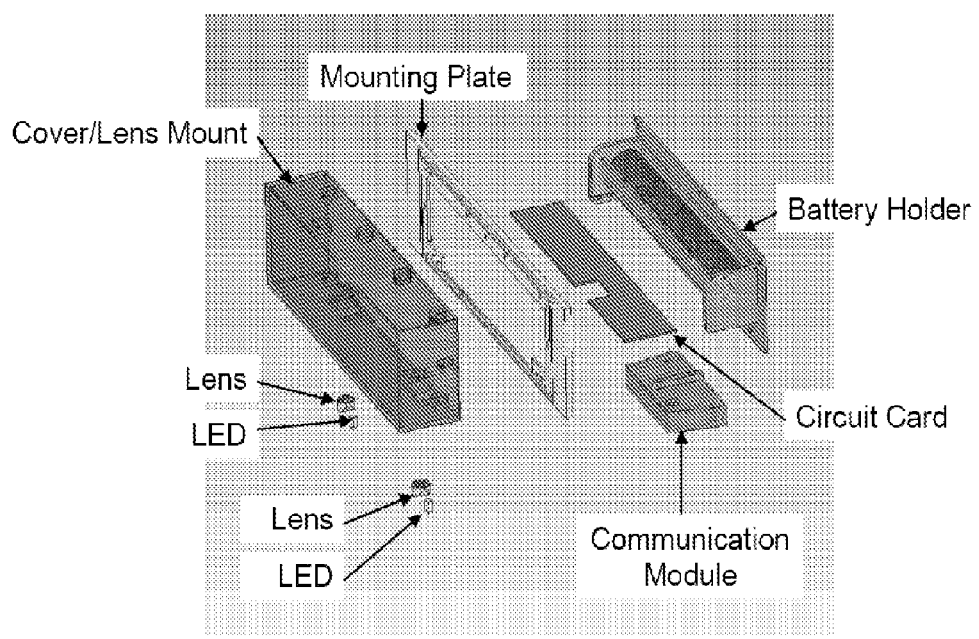
FIG. 10 illustrates an exploded view of a controller module for use in a container door status monitoring system in accordance with some embodiments of the present invention.

The controller module 220 can include one or more control processors, memory, a power supply, and a transceiver (see also FIGS. 3, 6, and 10). The transceiver can communicate with other wireless devices. If multiple processors are utilized, they can be configured to implement desired functions. For example, in currently preferred embodiments, three microprocessors are placed in the controller module 220. One of the processors is a main microprocessor is responsible for communicating with the outside world (e.g., users, wireless devices, etc.) via a wireless interface (e.g., a transceiver), recording events/alarms, and controlling two optical processors. The two optical processors are responsible for communicating with the door modules via the optical link. The processors are preferably programmed with logic thereby being configured to implement control algorithms in accordance with the embodiments of the present invention. Processors in the controller module 220 can include memory for storing firmware.

As one example, the controller module 220 is preferably configured to be responsible for managing all decisions in the CSD including declaring an alarm event. During arming of the CSD, the controller module 220 instructs the door modules 225 on what functions to perform and seeds each door module 225 with a code. Preferably, the code is a generated random number. The random number can be generated with Park-Miller-Carta random number generator or an ISAAC (Indirection, Shift, Accumulate, Add, and Count) Cryptographic Random Number Generator (CRNG). During communication, the door modules 225 respond to requests from the controller module 220. The door modules 225 use their seeded codes and the number of times they have been interrogated to respond to the controller module 220 at each interrogation. Based on the door module responses, the controller module 220 can determine if there is an alarm event or an event that needs to be logged.

Communication between the controller module 220 and the door modules 225 is preferably achieved via a wireless, bi-directional optical link. The link is used to transfer data between the modules, authenticating the correct door module, and measuring door position. Data is communicated using two IR pulses sent at varying times. This communication protocol can be used to determine the type of data being sent. Pulses received by the controller module 220 are projected onto detectors to determine the positions of the doors 210, 215.

The controller module 220 can use data transferred via the optical link to detect door openings, minimize false alarms, and detect system tampering. These functions can be performed using a system of interrelated interfaces. There are three optical events/paths between the controller module 220 and the door modules 225: (a) controller module 220 command transmission to the door modules 225; (b) reflected commands from the door modules 225 to the controller module 220; and (c) response transmissions from the door modules 225 to the controller module 220. Some implementations may not use all three of the optical paths. For example, currently preferred implementations do not implement the reflected path.

Communications between the controller module 220 and the door modules 225 is preferably a tiered communication protocol. For example, a command is first sent from the controller 220 to the door modules 225. A reflective surface located on the door modules 225 reflects and returns pulses to the command module 220. The controller module 220 uses these return pulses to verify that the door modules 225 are installed, nothing is blocking the communication paths, and to measure angular movement of the doors 210, 215. Measuring angular movement can aid in determining, for example, whether there has been a "bottom out, pivot at the top" type of door opening.

A third communication link in the tiered approach includes the door modules 225 sending transmissions (e.g., pulsed IR signals) to the controller module 220. The controller module 220 can use these transmissions from the door modules 225 to measure a door's lateral movement. The controller module 220 can also use the door modules' 225 responses to authenticate and verify that receipt of a correct code word (i.e., the pre-seeded code). The controller module 220 can perform a two-level check by first ensuring the code word matches the pre-seeded code for the respective door module and by secondly checking that the door modules 225 returned the correct code within appropriate time parameters. For example, the controller module can wait 170 ms before determining if the door modules 225 do not respond in time. If a problem is detected, it is first declared an event which is logged. At this point, the controller module 220 re-interrogates the door modules 225 immediately. If the controller module 220 detects a problem during the re-interrogation, an alarm is declared and logged. If no problems are detected during re-interrogation, no alarm is declared and the system resumes normal operation.

As discussed in this application, the controller module 220 can declare an alarm event based on a variety of received data. Generally, the controller module 220 is configured to execute firmware or software that monitors received data. When received data falls outside of stored parameters, the controller module 220 can declare an alarm. The stored parameters can be customized during the arming process via a user using a communication module (like communication module 105). In currently preferred embodiments, and with reference to the above-discussed tiered communication protocol, when tampering events causes a failure on one link, this will cause failures on the other two links. If the controller module 220 detects a problem on any of the links an "event" is declared. The controller module 220 can then perform a re-interrogation and declare an alarm if the controller module 220 detects a problem during the re-interrogation.

Embodiments of the present invention (like system 200) can be implemented with various styles of shipping containers. Several design constraints were encountered when considering the overall design of system 200. Since the link/detection system is optical, careful selection of materials and placement of the modules with a protected light path was required. Other factors that were encountered include: operating environment, placement in containers, installation constraints, and container variability. Container variability includes varying physical items such as door frame area, door weld beads, and door header dimensions of thickness and height. Based on these factors, the system 200 is currently preferred for large shipping container applications.

FIG. 3 illustrates a functional block diagram of a controller module 300 for a container security device monitoring system in accordance with some embodiments of the present invention. As shown, the controller module 300 includes a processor module 305 and support circuitry for controlling functions of the controller module 300. The processor module 305 can include one or more processors (like controller module 220). Processors in the processor module 305 can include memory for storing firmware. The processor module can also include a wireless interface for communication with a communication module (like communication module 105) The interface can be a 3.3V level RS-232 UART.

The controller module 300 can also include one or more memories. As shown, the controller module 300 can include a security data memory 310 and a commercial data memory 315. The memories 310, 315 can be coupled to the processor 305 via a standard SPI bus with microprocessor controlled power enables. The security and commercial memories 310, 315 can be individual components with each having storage capacity of 4 MB; other memory sizes may also be used as desired. The security data memory 310 can store items related to security of the controller module 300. The security data memory 310 can also store alarms, alarm and interrogation events, changes in CSD status, failed processes, changes in alarm data, CSD login/device accesses, failed CSD login attempts, door opening events, and door closing events. The commercial data 315 memory can be used to store items related to containers and movement of containers. This information can include container number, CSD ID number, container seal ID number, departure port, arrival port, ID number for CSD reader (which can be a communication module, like communication module 105), manifest ID number, and recorded temperature data. The security and commercial memories 310, 315 can also be configured to hold and store GPS data for tracking movement of a container. It should be understood that while multiple memories are shown in FIG. 3, some implementations may only have a single memory for storing data of interest. It should also be understood that the memories 310, 315 can both store the above-mentioned data points as well as others of interest.

Other functions of the controller module 300 include temperature and power supply functions. As shown, the controller module can include a temperature sensor 320. The temperature sensor 320 can be used to monitor temperature at desired or predetermined instances. By doing this, the controller module 300 can enable recordation of temperature data as desired. In addition, the controller module 300 can monitor temperatures and if extreme temperatures are encountered, these events can be recorded as alarms. The controller module 300 can include a battery monitor 325, a battery 330, and a voltage regulator 335. Battery voltage 330 can be regulated by the voltage regulator 335 and distributed to other controller module 300 components as illustrated. The battery monitor 325 can be controlled by the processor 305. In some embodiments, the battery monitor 325 is only enabled when a test is being performed and/or to reduce power consumption.

Yet another group of functions provided by the controller module 300 are related to signal transmission and reception. The controller module 300 can include LED/driver circuitry 340 and photo-detector/signal conditioning circuitry 345. Each of these devices can be coupled to and controlled by the processor 305. The LED/driver circuitry 340 can emit optical pulses as directed by the processor 305 to enable wireless, optical communication. The photo-detector/signal conditioning circuitry 345 can provide digital and analog signals to the processor 305 for timing and position measurements.

As currently preferred, the controller module's 300 functions can be implemented using three microprocessors with a few support components. The processors 305 can be Microchip nanoWatt Technology PIC24FJ256GA106 and PIC18LF2620. There are two clocks associated the microprocessors, one at 32.768 kHz and one at 4 MHz. The temperature sensor 320 can also a single component, such as a Microchip TC77. The battery 330 can be a 3.6V Lithium battery and the voltage regulator 335 can be performed by a Linear Technology LTC3025 VLDO voltage regulator. The LED/driver circuitry 340 can include two identical but independent optical channels implemented with two LED arrays and two driver circuits. The LED can be a Visahy TSAL6100 IR LED with +/−10° half power maximum width. The photo-detector/signal conditioning circuitry 345 can include an OSI SL5-2 5×1 mm position sensitive detector and Burr Brown OPA2363 operation amplifiers.

In designing the controller module 300, the inventors have accounted for a number of design considerations. For example, components have been selected for functionality and because they either had a low power mode or could be shut off via external control without impacting the operational readiness of the module. The power consumption design took into account the operational power consumption and the shutdown/disabled power consumption. All of the microprocessor power-saving features are utilized to conserve power during each phase of operation. The microprocessor 305 also has power control over all of the circuitry and the software selectively shuts down circuits when they are not being used.

The controller module 300 is preferably designed for both "lifetime" and "one-trip" operation. A main difference is the battery 330 needed. The controller module's 300 average armed current is 2.09 mA and its unarmed current is 1.27 mA. Those of skill in the art can best determine necessary battery ratings (e.g., Amp-hour ratings) depending on desired implementation and usage.

After arming of a container monitoring system as discussed herein (like system 200), the controller module 300 is the system scheduler once it has been armed. The controller module 300 makes all decisions relating to events and alarms and stores all security and commercial data. The controller module 300 also communicates with one or more communication modules via wireless links (e.g., RF links) to receive arming, interrogation, and download/disarm commands. The arming process can consist of a built-in-test (BIT) and characterization of the system as installed. No codeword pre-seeding of the door modules is necessary during manufacturing which allows for any module to be easily replaced if necessary. During the arming process, the controller randomly selects and transmits a seed code to each door module. While it is armed, the controller maintains a sequence count for each door response and can perform resynchronization of the codeword as desired. Door modules are preferably not re-synched after armed. As mentioned above, if a door module returns an incorrect value, the door module is re-interrogated. If the door module returns another incorrect value during the re-interrogation, an alarm is declared. A resynch preferably only occurs during loss and regain of power. Once armed, the communication module 300 can interface with one or more door controller module to monitor security of a container.

The controller module 300 can also have other features in accordance with the present invention. The controller module 300 can maintain all associated container data and a history log of events and alarms that have occurred since arming. All events and alarms will include a timestamp and can be accessed/downloadable by users. Events or alarms can be included in one of the following categories: Wakeup Attempts; Arming/Disarming (Security and Commercial); Sensed Door Conditions and Total Door Open Time; CSD Status/Condition; Alarm Events; External Query Communications (User Requests); Failed Communication Attempts; and Malicious Attacks (Intruder obstructing or attempting to simulate optical link). The container data, events, and alarms can be stored in two physically separate 4 Mbyte flash memory devices within the controller module. One device will store all commercial data while the other flash memory device will store all security data. In addition, all data saved in the security data memory can be stored as 16 byte AES encrypted blocks. Records within the memory will consist of the events, alarms, and container data. With a 4 MB memory, approximately 16K records can be stored. The available memory storage can be approximately 15 times this estimated storage requirement.

Figure 4:
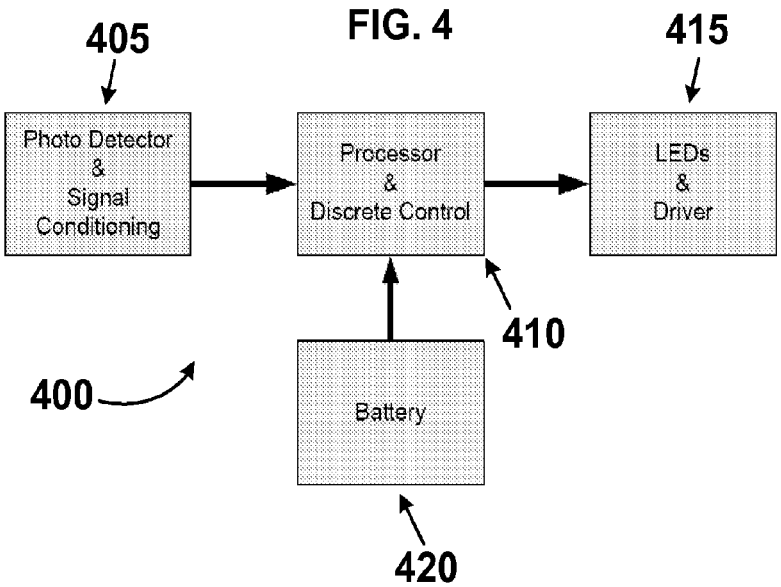
FIG. 4 illustrates a functional block diagram of a door controller module for a container security device monitoring system in accordance with some embodiments of the present invention.

FIG. 4 illustrates a functional block diagram of a door controller module 400 for a container security device monitoring system in accordance with some embodiments of the present invention. In currently preferred embodiments two modules 400 may be used for a system and mounted to each door of a shipping container (as illustrated in FIG. 2). The door controller module 400 can act as a slave to a controller module (like control module 300) and be configured to only respond to a controller module's commands. As illustrated, the door controller module 400 can include several components. These can include photo-detector/signal conditioning circuitry 405, a processor 410, LED/driver circuitry 415, and a power supply (e.g., battery 420). These are discussed in more detail below.

At arming, and as mentioned above, initialization between a controller module and the door controller module 400 can take place. The initialization can include performance of a built-in-test (BIT). The BIT can include a series of tests is executed by a controller module (like controller module 300) to baseline the door module's 400 position and power. During the BIT, the controller module 300 queries the door module 400 to perform the initial baseline procedure. The controller module 300 also transmits an initial seed value. The door module 400 responds with acknowledgements after each communication.

The door controller module's 400 components enable it to interact with a controller module (like controller module 300) for monitoring the security of a container. The LED/driver circuitry 415 can include three LED transmitters to accommodate varying thicknesses of the rear header. The LEDs can be used to provide optical signals to a controller module. The processor 410 can control all operations of the door module and places all functions in a standby/sleep mode when not actually communicating with the controller module 300. The photo-detector/signal conditioning circuitry 405 can receive pulses from the controller module 300 and verify a valid command. No position data is generated on the door module. The response to a command is sent out the LED/driver circuitry 415 selected by the controller module 300 during arming. The battery 420 powers the door controller module. The processor 410 can check battery status on command from the controller module 300.

In designing the door controller module 400, the inventors have accounted for a number of design considerations. The components were selected for functionality and because they either had a low power mode or could be shut off via external control without impacting the operational readiness of the module. The power consumption design took into account two factors: operational power consumption and shutdown/disabled power consumption. The processor's 410 power saving features are utilized to conserve power during each phase of operation. The processor 410 also has power control over all of the circuitry and the software selectively shuts down circuits when they are not being used. The door module is designed for "lifetime" or "one-trip" operation. The main difference is the battery 420 needed. The door module average armed current is 0.207 mA and its unarmed current is 0.198 mA. Those of skill in the art can best determine necessary battery ratings (e.g., Amp-hour ratings) depending on desired implementation and usage.

As currently preferred, the door controller module's 400 functions can be implemented with a single integrated circuit with a few support components. The processor 410 can be a Microchip nanoWatt Technology PIC18LF2620. There are two clocks associated with the microprocessors, one at 32.768 kHz and one at 4 MHz. The battery 420 can be a 3.6V Lithium battery. There are three identical LED drive circuits that are independently controlled by the microprocessor (so the LED block 415 represents multiple LED and driver circuits). Each LED is a Vishay TSAL6100 IR LED with +/−10° half power maximum width (the same as used on the controller module 300). The photo detector is an OSI PIN-6DI with a shutdown circuitry design that allows the microprocessor complete control over the detector.

Figure 5:
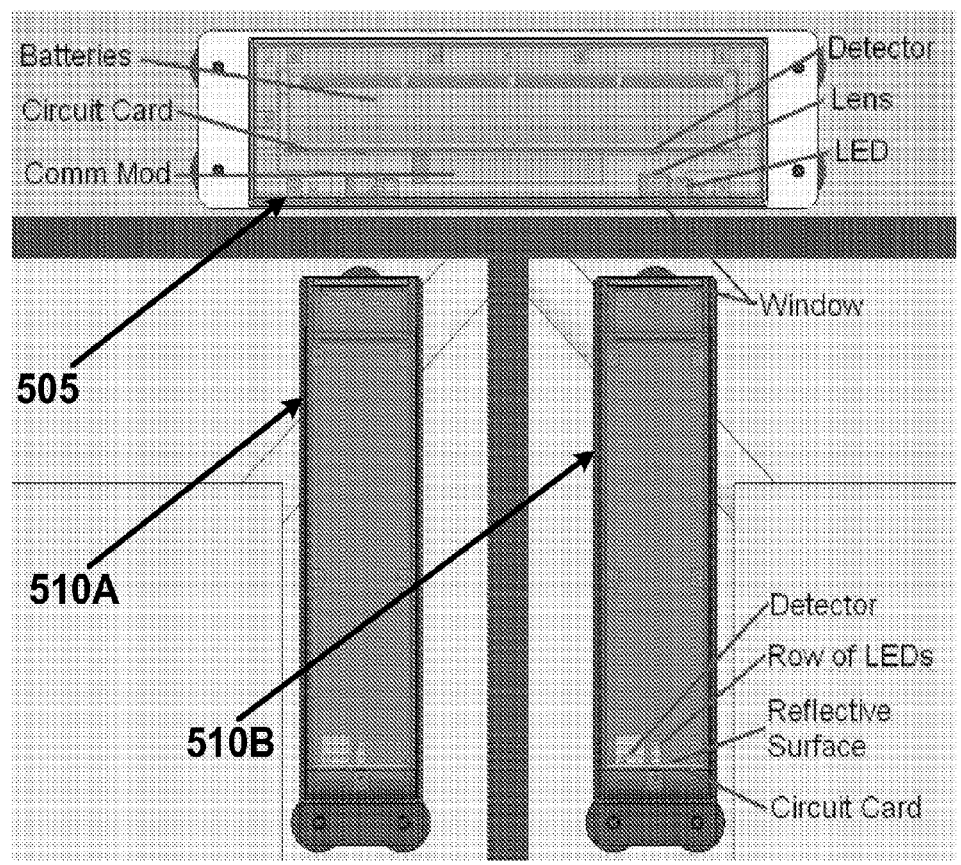
FIG. 5 illustrates a close up view of an exemplary installation of a container door status monitoring system in accordance with some embodiments of the present invention.

FIG. 5 illustrates a close up view of an exemplary installation of a container door status monitoring system 500 in accordance with some embodiments of the present invention. The system 500 generally includes a controller module 505 and two door modules 510 (510A and 510B). Together, the controller module 505 and the door modules 510 make up a CSD, and as illustrated, the CSD is mounted on the top rear header beam. This enables the CSD to have a minimal effect on container operation. The design of the door module software, electrical circuitry, and enclosure permit the door module to be used on a wide range of containers with door to header plane differences of zero to over three inches.

The CSD, as shown, contains a number of optical link components. For example, the controller module's 505 components include two GaAs IR LEDs emitting a 20° cone of 940 nm light, two f/1 plano-convex cylindrical lenses of focal length 12.5 mm, and two silicon 1-D position sensing photodiode of size 1×5 mm. Each of the door modules 510 includes three IR LEDs (identical to the ones in the controller module 505), a silicon photodiode of size 16.4 mm², and a reflective surface surrounding the bases of the LEDs and a photodiode. The modules 505, 510 use optical grade cell-cast acrylic windows to form an environmental seal with module packaging. The windows are also tinted to block background light in the visible portion of silicon's response band. Three LEDs are used in the door modules 510 to account for the uncertainty of the location of the mounted controller module. After initialization, only one of the three LEDs is used by the system to monitor the door status. The distance between the front vertex of the controller module lens and door module LEDs is approximately 25 cm which is much larger than the 8.5 mm spacing between the back surface of the lens and the detector.

Communication between controller and door modules of some embodiments of the present invention is achieved via a bi-directional optical link. The link can use pairs of GaAs IR LEDs and silicon photodetectors for transmitters and receivers. An on-off keyed encoding scheme based on the timing of light pulses emitted by the LEDs is used to communicate information across the link.

An interaction diagram of the optical links is shown in FIG. 6, and the nature and purpose of each optical link path is shown in FIG. 7. In one path, sequences of light pulses from the controller module are used to transmit command communications to the door module. In another path, the door module transmits pulse sequences that contain response communications to the controller module. Also, for this path, the energy and arrival angle of the pulses are monitored by the controller module to detect changes in the open/closed status of the container doors. The last optical path begins and ends with the controller module. For this path, the controller module monitors the energy and arrival angle of its own emitted pulses that have been reflected by a reflective and/or mirrored surface within the door module to detect tampering attempts or damage to the door module. As there are two dedicated optical links within the CSD (one for each door), the controller module has two LEDs and two detectors (as mentioned above with reference to FIG. 5). The optical path from the controller module to the door module is a simple free-space propagation of emissions from an LED to a photodetector.

A key function of embodiments of the present invention is to detect transitions between two nominal container door states. This can be accomplished by monitoring positions of an LED located in each door module. The horizontal positions of door modules relative to the controller module while the container door is closed is different from the position when the door is opened—this difference enables detection of an open door to be performed. The controller module monitors the position of the LED using an internal single-lens imaging system as discussed below.

FIG. 8 illustrates a graphical depiction of a lens 800 used in controller module devices according to some embodiments of the present invention. The single-lens imaging system 800 within a controller module incorporates a plano-convex cylindrical lens and a one-dimensional position sensing detector (PSD) with a rectangular detection area. The curved refracting surface of a plano-convex cylindrical lens can be described as having a constant radius of curvature in one cross-section while having no curvature in the orthogonal cross-section. This type of lens focuses power in only one axis as illustrated. In currently preferred embodiments, only the controller module has the cylindrical lenses, as it is not necessary for the door modules to determine their position relative to the controller module. For optical transmissions from the controller module to the door modules, a simple bare photodiode can be used to detect light pulses from the controller module LEDs.

FIG. 9 illustrates schematic and optical diagrams of a photodetector 900 (PSD) used in controller module devices according to some embodiments of the present invention. The PSD 900 is a special type of photodiode with two anodes and one cathode. The behavior of this detector is represented electrically and optically in FIG. 9. The PSD 900 can produce two photocurrents through each anode. The magnitudes of the two photocurrents vary with respect to a centroid of the irradiance pattern that falls upon the active area of the PSD's photodiode. The relationship between the relative position of this centroid and the two anode photocurrents is given by the following equation. As a result, the reported position of the irradiance centroid is independent of the total amount of incident irradiance.

$$\frac{2x}{L} = \frac{I_{23} - I_{13}}{I_{23} + I_{13}}$$

During operation of a container monitoring system of the present invention, the lens 800 and the PSD 900 can be positioned within a controller module. For example, the lens and PSD need to be co-located within the same module at fixed relative positions. The lens 800 can be located a distance d' away from the PSD 900 and be orientated so the radii of curvature of the lens 800 lies in planes parallel to the plane containing the major axis of the PSD 900. The LED in a door module is nominally located a distance d away from the lens. The two distances are chosen to satisfy the thin-lens imaging equation (where f is the focal length of the lens):

$$\frac{1}{d'} + \frac{1}{d} = \frac{1}{f}$$

The curved surface of the lens 800 focuses light from an LED onto the PSD 900. In doing so, the cylindrical lens can form a pseudo-image of the LED onto the PSD 900. This results in the point-source LED emission being transformed into a thin line orthogonal to the major axis of the PSD 900. This received optical signal can then be used to provide data about door position status.

As illustrated in FIG. 7, embodiments of the present invention utilize varying signals and varied measured quantities to determine a door module's status relative to the controller module. This information aids in determining whether a container's doors have been disturbed, tampered with, opened, removed, and/or otherwise disturbed. For ease of discussion, description of the communication is discussed in phases. The phases can continuously occur simultaneously or in accordance with any desired arrangement or order. Microcontroller software within the controller module controls all timing of the various communications knowing when it is transmitting and when to expect responses from the door modules. As a result, the control module will not be confused by detected/received signals from the PSD.

In an initial communication phase, with a first signal sourced by the controller and received by the door modules, the controller module can determine whether the optical path is clear by determining if a reflection from door module has been received. The controller module can also engage in command-type communications (e.g., seeding of) with door modules in this initial communication phase. The controller can communicate signals to the door modules with a communication protocol based on timing of optical pulses (as discussed in more detail below).

Another communication phase includes signals sourced by the door modules and received by the controller module. In this phase, the controller module can obtain data from the door module. This data can come in the form of optical power strength, pulse timing, and irradiance centroid position. This data can provide information such as optical path changes, command response communications, and lateral door movement.

In another communication phase, the controller module can source signals that are reflected back to the controller module for observation. Reflected signals can provide information such as door module presence and angular door movement. The data can come in the form of optical power strength and irradiance centroid position.

As discussed above and illustrated in FIG. 9, embodiments of the present invention can utilize a PSD as a way to obtain irradiance centroid position data. This detection scheme is independent of received optical power from the door module LEDs. Instead, photocurrents flowing through the two anodes of the PSD varies in magnitude relative to each other with the position of the irradiance centroid of the light pattern incident upon the PSD. The light pattern is an ellipsoid of light whose major axis is perpendicular to the major axis of the PSD. When a container door is closed, the light pattern will ideally be positioned close to the center of the PSD. Photocurrents associated with this position flow through load resistances in the controller module producing voltages which are converted by the microcontroller in the controller module to digital values relative to a common reference voltage. The two digital values are used by the microcontroller to calculate position (represented by a digital value) of the light pattern centroid. The position can be calculated using the first equation shown on the preceding page. During initialization, an initial position can be calculated and stored as a reference value for later use.

After calculation of an initial position, the system can continue to calculate updated position data for comparison to the initially calculated reference value. As the door opens from the closed position, the light pattern and its centroid will shift in position along the major axis of the PSD producing a change in the relative amount of currents flowing through the PSD anodes. Because the position value derived from the PSD currents is continuously calculated by the microcontroller, any change in the value above a programmed threshold will result in an open door detection declaration by the microcontroller.

In some embodiments of the present invention, the door modules may include multiple LEDs to accommodate for varying container sizes. In these situations, during system initialization, the controller module can observe light transmitted from the multiple LEDs and based on position, the controller module can instruct which of the multiple LEDs the door modules should use in subsequent communications. For example, in some implementations, the door modules can each include three LEDs. The three LEDs can be lit individually in a sequence during initialization. The controller module can determine the individual LED that produces a light pattern closest to the center of the PSD. Then the controller module can instruct the door module to use that LED for all subsequent door status monitoring or until the next initialization process.

FIG. 10 illustrates an exploded view of a controller module 1000 for use in a container door status monitoring system in accordance with some embodiments of the present invention. As illustrated, the controller module 1000 assembly has several components. The communication module mounts to a controller circuit card. The circuit cards are then mounted to a cover/lens mount and a cover is fastened to the mounting plate. Finally the battery holder is fastened to the mounting plate. The battery holder and batteries are mounted to the controller module from the back and cover up all of the cover fasteners. Once the battery compartment is mounted to the mounting plate with flat head screws, the back of the controller module 1000 provides a flat surface for mounting with all fasteners between the controller module 1000 and the header for tamper resistance.

Figure 11:
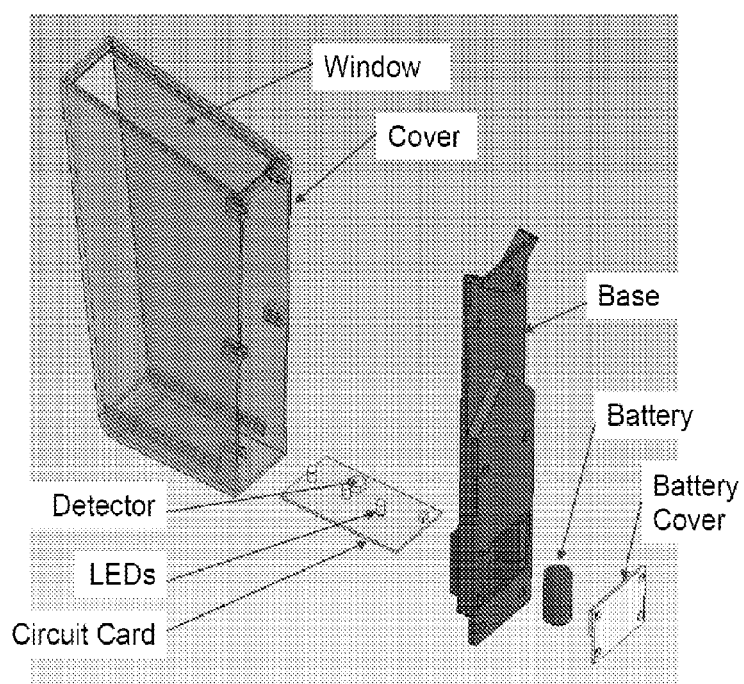
FIG. 11 illustrates an exploded view of a door module for use in a container door status monitoring system in accordance with some embodiments of the present invention.

FIG. 11 illustrates an exploded view of a door module 1100 for use in a container door status monitoring system in accordance with some embodiments of the present invention. The door module 1100 assembly has several parts. A circuit card is mounted to a cover, and the cover is mounted to a base plate. A battery can be inserted in a compartment in the base plate, and a battery cover can be fastened in place. Once the battery cover is mounted to the base plate with flat head screws, the back of the door module 1100 provides a flat surface for mounting with all fasteners between the door module 1100 and the door for tamper resistance.

Method Embodiments

Now that various device and system embodiments of the invention have been discussed, attention will be turned to method embodiments of the invention. The method embodiments can be carried out and implemented as hardware, software, or a combination of both. Some method implementations can include computing instructions stored on a media for execution by a processor or state machine. Some method implementations can include reception of data, data analysis, and in response to data, certain actions can be taken. While certain method embodiments are shown and discussed, those of skill will understand that the discussed methods can be implemented in various orders, certain actions may not be necessary, and other actions can be added to the discussed method embodiments. In addition, the discussed methods can be combined together to enable secure methods of monitoring the status of a container as discussed herein. The various method embodiments can be implemented with the various components and devices discussed in this application. Various flow diagrams are state diagrams are illustrated and discussed; these diagrams represent algorithms for implementing various method embodiments of the present invention.

In some embodiments, methods can be implemented by embedding software as two separate applications. One application can be executed within a controller module's processor. This application can handle communication with door modules and RF communication module, monitor the door status and internal container temperature, and store all events, alarms, and container data in memory. Another application is a door module application. The door module application can be executed by a door module's processor, and be responsible for communication with a controller module. The inventors currently prefer the Microchip MPLAB application development suite to develop, program, and debug embedded software onboard the PIC processors (specifically, the MPLAB ICD 2 In-Circuit Debugger, MPLAB C18 C, and MPLAB C30 compilers can be used). This combination will provide faster software development and problem solving.

Figure 12:
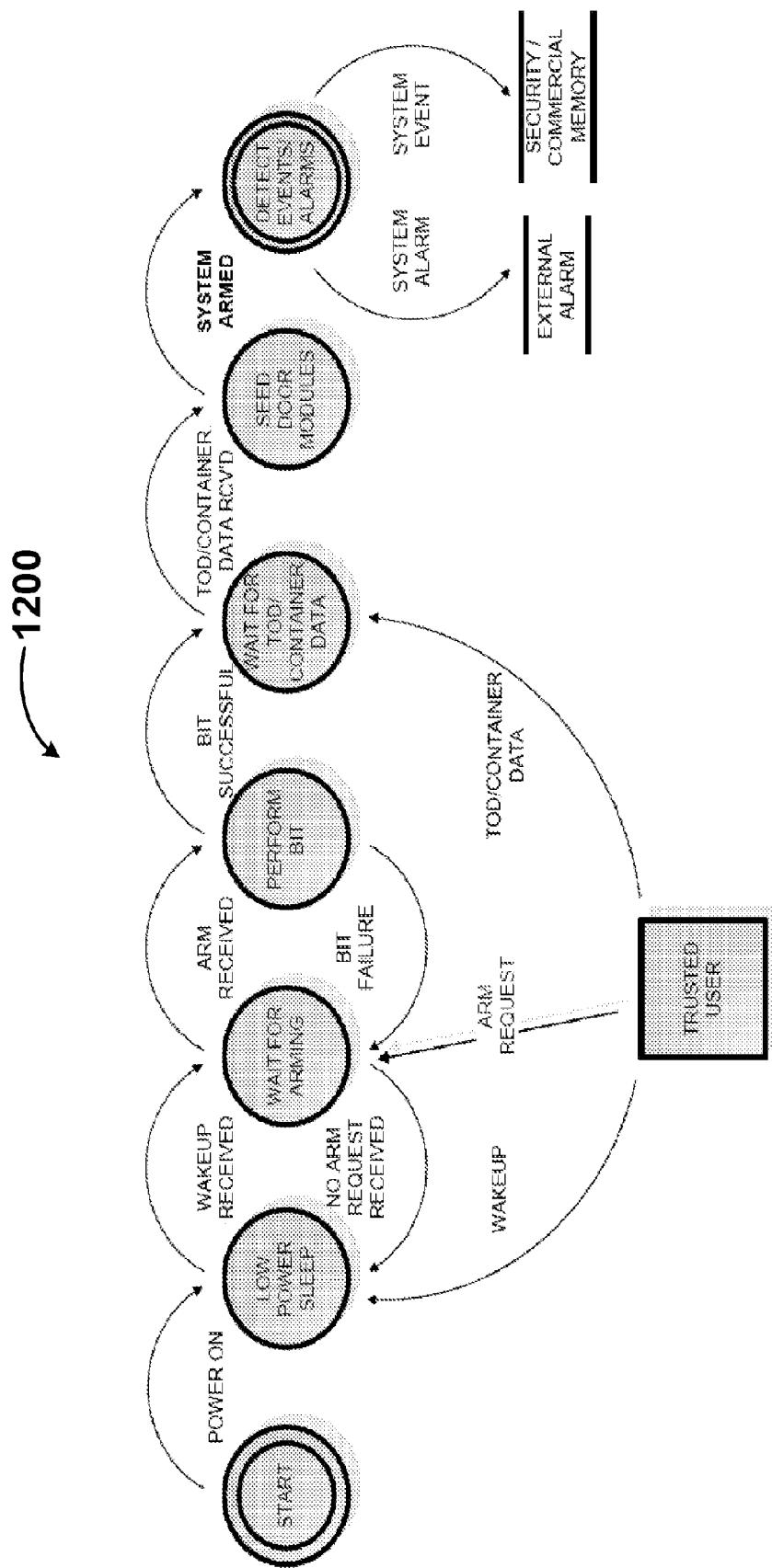
FIG. 12 illustrates a logical flow diagram of a method to arm a container status monitoring system in accordance with some embodiments of the present invention.

FIG. 12 illustrates a logical flow/state diagram of a method 1200 to arm a container status monitoring system (that includes a CSD) in accordance with some embodiments of the present invention. Before arming the CSD, both the controller module and door module will be in a sleep mode to conserve power consumption when not in use. In the sleep mode, the processors in the system are put in sleep mode. Any communication with the system will wake up the controller module's main processor (MP). When the system is commanded to arm, the MP can wake up the door module's Door Interface Processors (DIPs) and instruct the MP and DIPs to begin the interrogation function. The MP stays in sleep mode while armed until it receives communication from either an external device or the one of the DIPs. The DIPs stay in sleep mode in between interrogations.

After receiving an arming request from a user, the controller module will request the current time and other data. The data can include container specific data, Container ID, Manifest ID, Mechanical Seal ID, and any other desired data (including the previously described data points). Once the current time and other desired data has been received, the controller module will execute a Built-In-Test (BIT) to ensure all on-board components and door modules are functioning correctly. Then, once the BIT completes successfully, the controller module will seed each door module with a separate code so that the all subsequent communication between the controller module and door modules utilizes a pseudo-random number generator (PRNG). After both door modules have been seeded successfully with a code, the CSD will inform the user that it is now armed. If the BIT fails, the door modules are not seeded correctly, or the current time or container data is never received, the CSD will not arm.

The system BIT verifies the correct operation of the controller module and door module before arming. As discussed above, if any test fails during the BIT, the CSD will not arm. The following tests will occur during the BIT: (a) Controller module internal BIT; (b) Door module internal BIT; (c) Controller module LEDs response and baseline test; (d) Door module LEDs response and baseline test; (e) Timing test between controller and door modules; and (f) Flash memory test. In addition to ensuring the healthy status of the CSD, the system BIT will also verify that the doors have been closed prior to arming. It is this initial position of the door that will be used as a baseline for the required 2 in. detected movement during normal processing.

Figure 13:
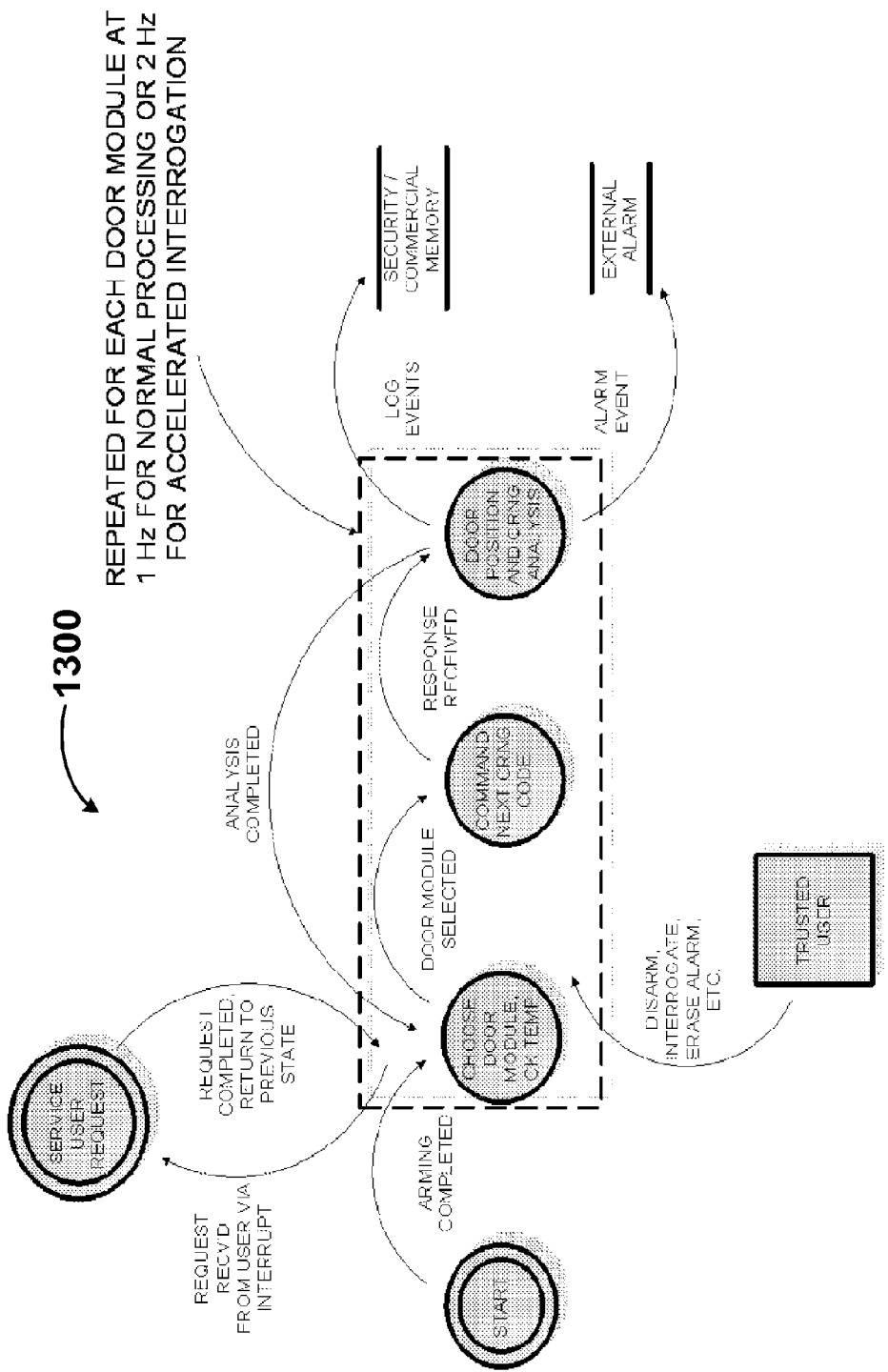
FIG. 13 illustrates a logical flow diagram of a method to monitor the status of a container in accordance with some embodiments of the present invention.

FIG. 13 illustrates a logical flow/state diagram of a method 1300 to monitor the status of a container in accordance with some embodiments of the present invention. When the arming process completes successfully, the CSD will enter a normal processing state. During this mode of operation, the controller module will interrogate each door module at least once a second, log events, activate an external alarm if applicable, and monitor internal container temperature. In addition, any requests from a trusted user (via a communication module) will also be serviced.

The door module interrogation consists of a controller module command requesting the next code. The door module will then respond with the next code. From these transmissions, the controller module will determine if the door has been opened or if an intruder is tampering with the system. If an incorrect code is returned or if the container door has been moved two inches, the controller module will re-interrogate the applicable door module(s) to ensure that the previous transmission was received correctly. If the door open status or incorrect code is verified by the second transmission, the controller module will activate the external alarm. If a door closed status or correct code is determined, however, the controller module will revert to the 1 Hz interrogation rate.

Figure 14:
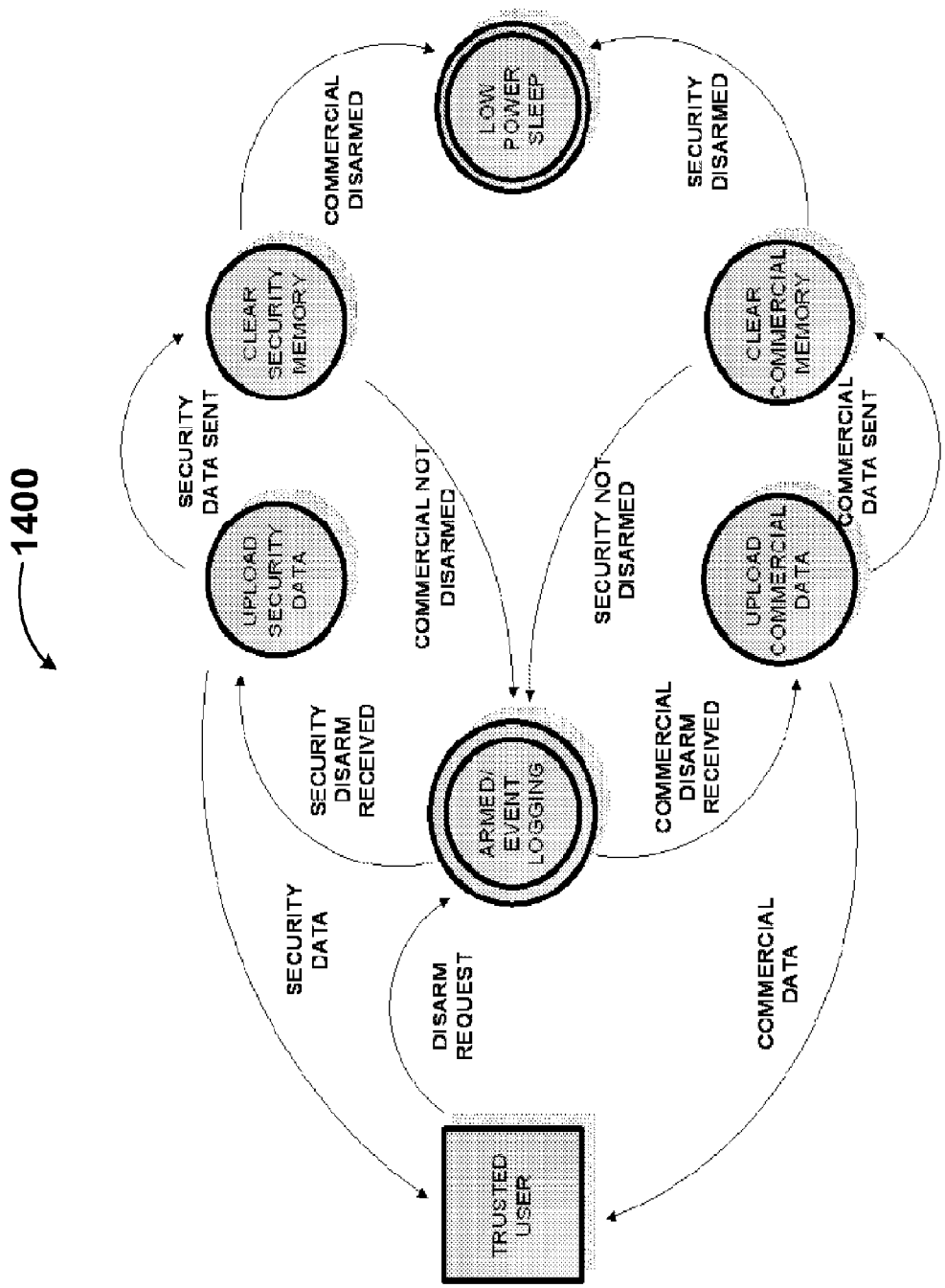
FIG. 14 illustrates a logical flow diagram of a method to disarm a container status monitoring system in accordance with some embodiments of the present invention.

FIG. 14 illustrates a logical flow/state diagram of a method 1400 to disarm a container status monitoring system in accordance with some embodiments of the present invention. The disarming procedure will begin with a request from a trusted user. There are two types of disarming: security data and commercial data. Trusted users preferably request event logs prior to disarming as a disarm request can clear associated memory. If only one type of disarm has been completed, the CSD will continue normal processing after fulfilling the user's request. Once both the security and commercial disarm procedures have been executed, however, the CSD will enter the low power sleep state to conserve energy.

Wireless Communication Protocols

FIGS. 15-19 illustrate various details about communication protocols implemented by embodiments of the present invention. The communication protocol can be implemented via optical wireless links as well as via other communication methods (e.g., RF Wireless). Discussion of the protocols is provided separately since the system and method embodiments of the present invention can employ these protocols. Other protocols may also be employed so the embodiments of the present invention are not limited to these protocols.

FIG. 15 illustrates a timing diagram of a communication protocol showing interrogation of a door module by a controller module in accordance with some embodiments of the present invention. As stated in previous sections, the controller module and door module will communicate via an optical link. Each round-trip transmission will be initiated by the controller module and will consist of four pulses, two generated by the controller module (command or data) and two produced by the door modules (status or data). The protocol shown in FIG. 15 minimizes power consumption while providing a secure communication scheme as it is extremely difficult to replicate. All pulses are approximately 100 µs in duration. Each one-way transmission will endure a maximum of 0.25 seconds or 512 time slots with each time slot being 488.3 µs in length. The second pulse will mark the end of the one-way transmission. Most transmissions will be less than 0.25 seconds.

FIG. 15 illustrates four signal timing diagrams. Transmitted signals are the "Controller LED" and "Door LED" signals. Received signals are the Controller Detector and Door Detector Signals. The Controller LED signal is a signal transmitted from a controller module to a door module, the Controller Detector signal is a signal reflected by a door module to the controller module, the Door Detector signal is a signal received at a door module from a controller module, and the Door LED signal is a signal transmitted from a door module to the a controller module. In some embodiments, the Controller Detector reflected signal may not be used (as mentioned above). The first pulse by each module is the Synchronization Pulse (Sync Pulse) and will mark "Time Slot 0" for each one-way transmission.

The amplitude of the first pulse by the door modules will be measured by the controller module to determine the lateral movement of the door. The second pulse for the controller module will either serve as a command or data value while the second pulse by the door module will serve as a status response or data value. The second pulse by the controller module will be partially reflected by a reflective surface on the door module. The reflection will provide a simple mechanism to verify the door is present and the amplitude of the reflected pulse will give the angle of the door to the controller module. This will be accomplished by comparing the reflected power to the power baseline recorded during the BIT. The lateral movement and angle measurements resulting from these transmissions will be combined to determine the movement of each door.

The pulses shown in FIG. 15 can be segmented into time slots by pulse number. FIG. 16 illustrates a table providing an exemplary controller module time slot definition protocol in accordance with some embodiments of the present invention. The table illustrates controller time slot definitions. FIG. 17 illustrates a table providing an exemplary door module time slot definition protocol in accordance with some embodiments of the present invention. In both tables, each slot signifies a unique command, status, or data value of that transmission.

Figure 18:
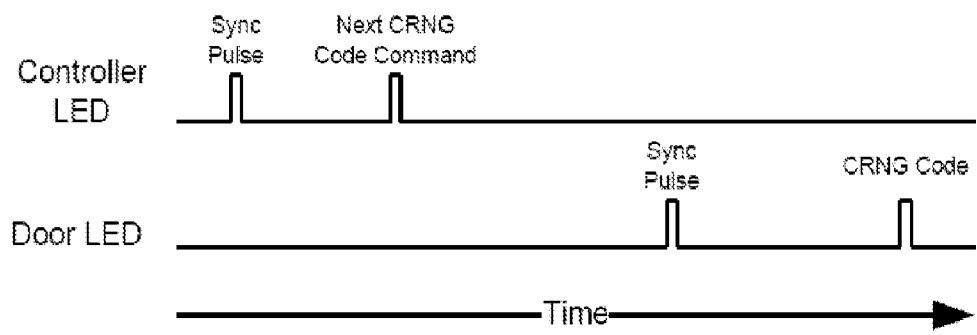
FIG. 18 illustrates a timing diagram showing interrogation of a door module by a controller module to obtain a randomly generated code word in accordance with some embodiments of the present invention.

FIG. 18 illustrates a timing diagram showing interrogation of a door module by a controller module to obtain a randomly generated code word in accordance with some embodiments of the present invention. As mentioned above, embodiments of the present invention can generate a random code word. The code word can be provided by controller modules to door modules to enhance security. While currently preferred embodiments use a CRNG generator other generators may be used.

A Park-Miller-Carta algorithm will be used to during the interrogation communication between the controller and door module. This specific PRNG creates a pseudo-random sequence of 31-bit numbers that are uniformly distributed, and unbiased. The controller module will seed each door module with a separate 32-bit value immediately prior to arming the system. During a normal interrogation, the controller module will request the door module to respond with the next PRNG code. If the door module responds with two consecutive incorrect PRNG codes, the controller module will activate the external alarm.

Figure 19:
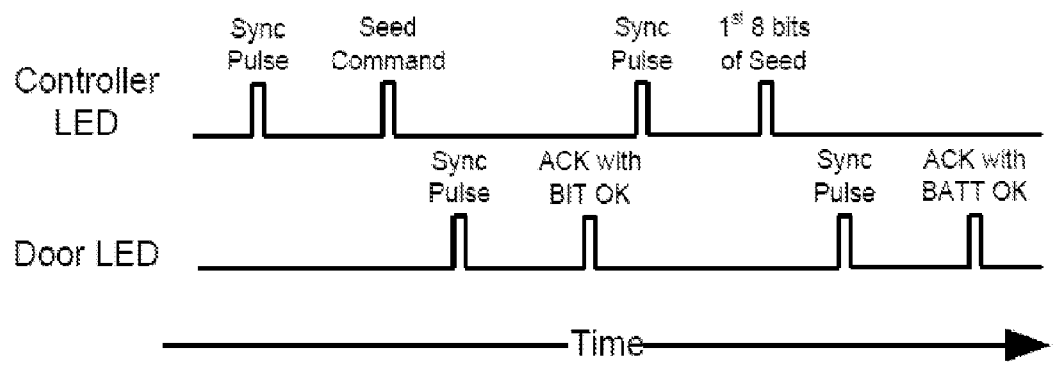
FIG. 19 illustrates a timing diagram showing seeding of a door module with a randomly generated codeword by a controller module in accordance with some embodiments of the present invention.

FIG. 19 illustrates a timing diagram showing seeding of a door module with a randomly generated codeword by a controller module in accordance with some embodiments of the present invention. Since the transmission scheme only allows for up 256 possible data values (8 bits) to be sent at one time, four data transmissions in addition to the seed command transmission will be required for the controller module to seed the door module.

Wireless Access to CSD System Generally

Figure 20:
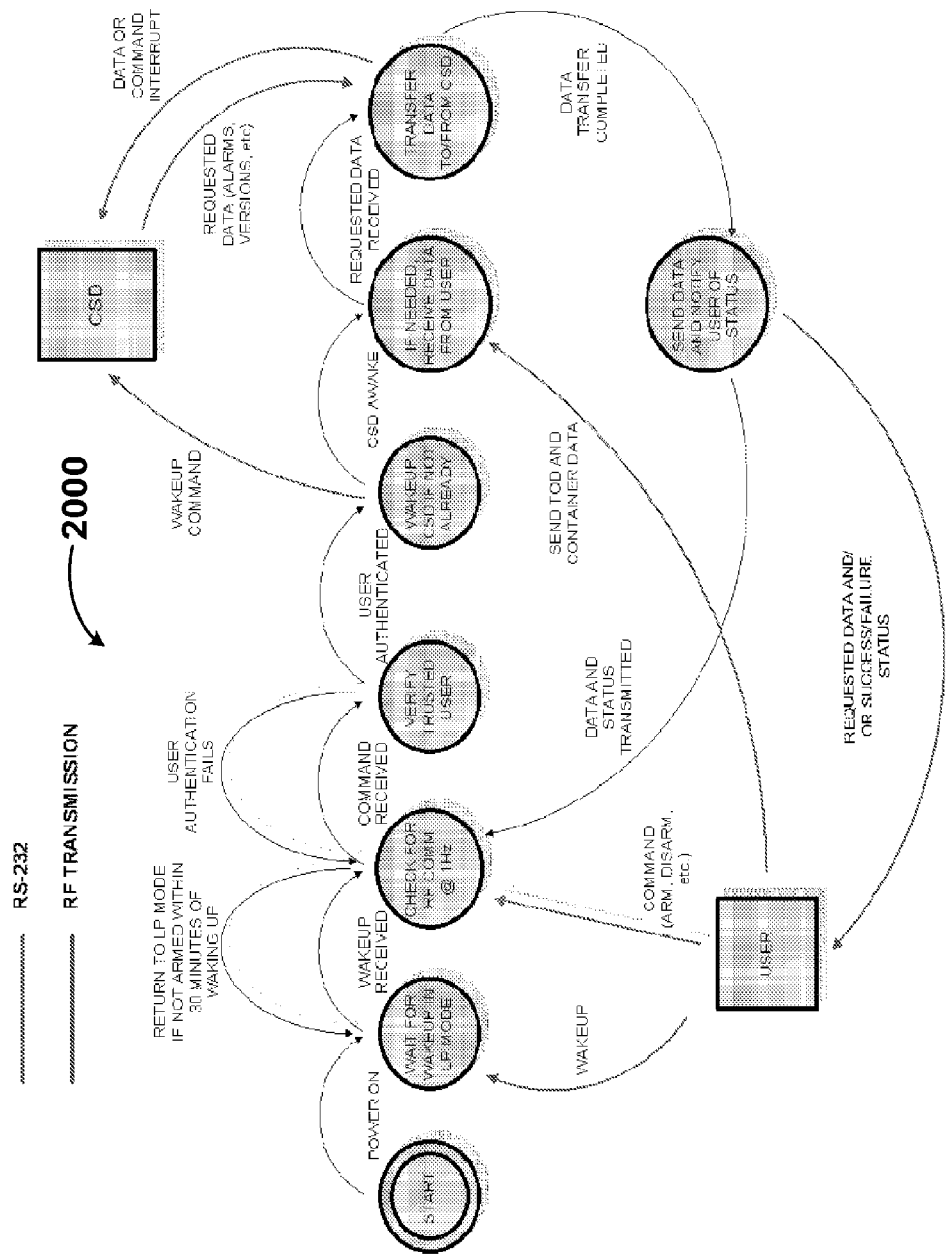
FIG. 20 illustrates a logical flow diagram of a data communication method between a mobile, wireless user interface and a container status monitoring system in accordance with some embodiments of the present invention.

FIG. 20 illustrates a logical flow/state diagram 2000 of a communication method between a mobile, wireless user interface and a container status monitoring system in accordance with some embodiments of the present invention. As discussed, system embodiments of the present invention can utilize a communications module (like communications module 105) to provide an interface to users. Preferably, the communications module 105 includes an RF communications module will serve as the interface between users and the CSD's controller module.

The controller module will communicate with the RF communications module solely over a UART interface. The RF communications module consists primarily of the Local Communications Module (LCM) and the Remote Communications Module (RCM). The LCM will be physically located in the same housing and will interface directly with the controller module over a UART interface. The LCM will communicate to the RCM mounted external to the container via RF transmissions. The RCM will then communicate to trusted users via RF also. The RF communications module will verify the requesting user's identity so that the controller module can assume all requests from the LCM originate from a trusted user. Also, the controller module will use this UART communication as a wakeup interrupt during the sleep mode.

Conclusion

The embodiments of the present invention are not limited to the particular formulations, process steps, and materials disclosed herein as such formulations, process steps, and materials may vary somewhat. Moreover, the terminology employed herein is used for the purpose of describing exemplary embodiments only and the terminology is not intended to be limiting since the scope of the various embodiments of the present invention will be limited only by the appended claims and equivalents thereof. Indeed, the above descriptions are exemplary and yet other features and embodiments exist.

Therefore, while embodiments of the invention are described with reference to exemplary embodiments, those skilled in the art will understand that variations and modifications can be effected within the scope of the invention as defined in the appended claims. Accordingly, the scope of the various embodiments of the present invention should not be limited to the above discussed embodiments. Rather, the full scope of the invention and all equivalents should only be defined by the following claims and all equivalents.

We claim:

1. A container monitoring system configured to monitor access to and conditional status of a container, the system comprising:
   a first door controller module disposed in communication with a controller module, the first door controller module configured to receive a first random generated code from the controller module and further configured to store the first random generated code;
   a second door controller module disposed in communication with the controller module, the second door controller module configured to receive a second random generated code from the controller module and further configured to store the second random generated code,
   wherein the controller module comprises a lens and a photodetector, the lens being configured to receive an optical signal having a corresponding light pattern and direct the optical signal to the photodetector, and wherein the controller module is configured to:
      separately interrogate the first door controller and the second door controller;
      establish one or more alarm conditions based on one or more signals received from the first door controller and the second door controller; and
      detect a shift in position of the light pattern of the optical signal along an axis of the photodetector in response to the first door controller or the second door controller moving with respect to the controller module,
   wherein the one or more alarm conditions comprise an alarm condition wherein a change in a position value, associated with the shift in position of the light pattern of the optical signal, is above a predetermined threshold.

2. The system of claim 1, wherein the one or more alarm conditions comprise an alarm condition based on errors in reception of at least one of the first random generated code from the first door controller and the second random generated code from the second door controller.

3. The system of claim 1, wherein the one or more alarm conditions comprise an alarm condition based on a power level of an optical signal received at the controller module from at least one of the first door controller and the second door controller.

4. The system of claim 1, wherein the controller module contains a first optical transceiver to optically communicate with the first door controller and a second optical transceiver to optically communicate with the second door controller, and wherein the first and second door controller modules are configured to transmit optical signals toward the controller module.

5. The system of claim 1, wherein the controller module, the first door module, and the second door module are configured for installation within a container and in arrangement wherein the controller module is configured to be positioned proximate a middle header region.

6. The system of claim 1, further comprising a wireless transceiver configured to transmit data from the controller module to a wireless device that is remote from the controller module.

7. The system of claim 1, wherein the lens of the controller module comprises a plano-convex lens configured to focus optical signals received from the first and second door controller module onto the photodetector of the controller module.

8. The system of claim 1, wherein the first and second door controller modules are arranged so that optical transmitters disposed within the first and second door controllers are configured to transmit light in a normal direction toward the plane of the photodetector of the controller module.

9. In a container monitoring system configured to monitor access to and conditional status of a container, wherein components of the container monitoring system are configured to be affixed to internal locations within the container, the system comprising:
a first door module comprising a power supply, an LED array, a photodetector, and a first-door-module processor;
a second door module comprising a power supply, an LED array, a photodetector, and a second-door-module processor;
a controller module assembly comprising a power supply, an LED array, a photodetector array, and a controller-module processor, the controller-module processor configured to generate psuedo-random code words for provision to the first-door-module processor and the second-door-module processor, and wherein the controller-module processor is further configured to determine an alarm event based on a shift in a position of at least one of the first door module and second door module relative to the controller module, wherein the shift in position of the at least one of the first door module and second door module is determined based on a shift in position of light received at the photodetector array from at least one of the LED array of the first door module and the LED array of the second door module.

10. The system of claim 9, wherein the controller module is attached to a header portion of a container, the first door module is attached to a first door of the container, and the second door module is attached to a second door of the container, and wherein the controller module determines positioning status information of the first and second doors by communications with the first door module and the second door module.

11. The system of claim 9, the LED array of the controller module assembly comprising a first LED positioned to communicate with the first door module and a second LED positioned to communicate with the second door module.

12. The system of claim 9, the photodetector array of the controller module comprising a first lens positioned to receive an optical signal from the first door module and a second lens positioned to receive an optical signal from the second door module.

13. The system of claim 9, the controller module further comprising an RF transceiver enabling the controller module to wirelessly communicate with a remote wireless device, and wherein the controller module is configured to receive wireless arm and disarm commands from a wireless device, and in response to the commands, arm or disarm the system to monitor a container.

14. The system of claim 9, the first door module and the second door module each comprising a reflective surface positioned to reflect a light signal received from the controller module back to the controller module.

15. The system of claim 9, wherein the controller module is configured to generate the pseudo-random code words using the Park-Miller-Carta pseudo random number generator (PRNG).

16. The system of claim 9, wherein the controller-module processor, the first-door-module processor, and the second-door-module processor are configured to communicate with each other using a segmented, pulsed optical communication protocol.

17. The system of claim 9, wherein the controller module processor is configured to determine an alarm event based on data received from at least one of the first door module and the second door module.

18. The system of claim 9, wherein the controller-module processor is further configured to select one or more particular LEDs from the LED array of the first door module and one or more particular LEDs from the LED array of the second door module for optical communication with the controller module.

19. The system of claim 18, wherein the LEDs in at least one of the LED array of the first door module and LED array of the second door module are configured to transmit, in sequence, light to the photodetector array of the controller module during initialization of the container monitoring system.

20. The system of claim 18, wherein each LED of a plurality of LEDs in the respective LED array of at least one of the first door module and second door module is positioned to transmit light, having a respective light pattern, to the photodetector array of the controller module, and wherein the controller-module processor selects the one or more particular LEDs for optical communication with the controller module based on the respective light pattern.

* * * * *